United States Patent [19]
Miller, Jr.

[11] 3,739,912
[45] June 19, 1973

[54] SCREENING AND AERATING CONCENTRATOR

[75] Inventor: Robert P. Miller, Jr., Pasadena, Calif.

[73] Assignee: Sweco, Inc., Los Angeles, Calif.

[22] Filed: May 6, 1971

[21] Appl. No.: 140,916

[52] U.S. Cl. .................. 210/63, 210/78, 210/170, 210/377, 210/433, 261/3
[51] Int. Cl. ............................................. B01d 33/02
[58] Field of Search ..................... 210/63, 78, 170, 210/377, 433; 261/3

[56] References Cited
UNITED STATES PATENTS
3,627,130   12/1971   Talley, Jr. ............................ 210/78
FOREIGN PATENTS OR APPLICATIONS
1,328,584   4/1963   France ................................ 210/63

Primary Examiner—Samih N. Zaharna
Assistant Examiner—F. F. Calvetti
Attorney—Lyon & Lyon

[57] ABSTRACT

There is disclosed herein a method and system of screening and simultaneously aerating wastewater, such as storm water overflow containing untreated sewage. The method involves one or more high-rate rotating screen concentrators wherein the influent is fed to the interior of a generally cylindrical, rapidly rotating screen. The concentrator is constructed to permit dispersion and atomization of effluent for increasing exposed fluid surface area and for improving contact thereof with air to increase the dissolved and/or entrained oxygen in the effluent. This may be accomplished by allowing a relatively unobstructed fall of the effluent out-wardly into a container, storage tank, treatment or storage lagoon or the like. The dissolved oxygen aids aerobic digestion and the entrained oxygen aids in frothing of the effluent for subsequent floatation and separation of fine solids and oils. The concentrated material which does not pass through the screen may be piped to a treatment facility.

11 Claims, 3 Drawing Figures

PATENTED JUN 19 1973
3,739,912
FIG. 1.
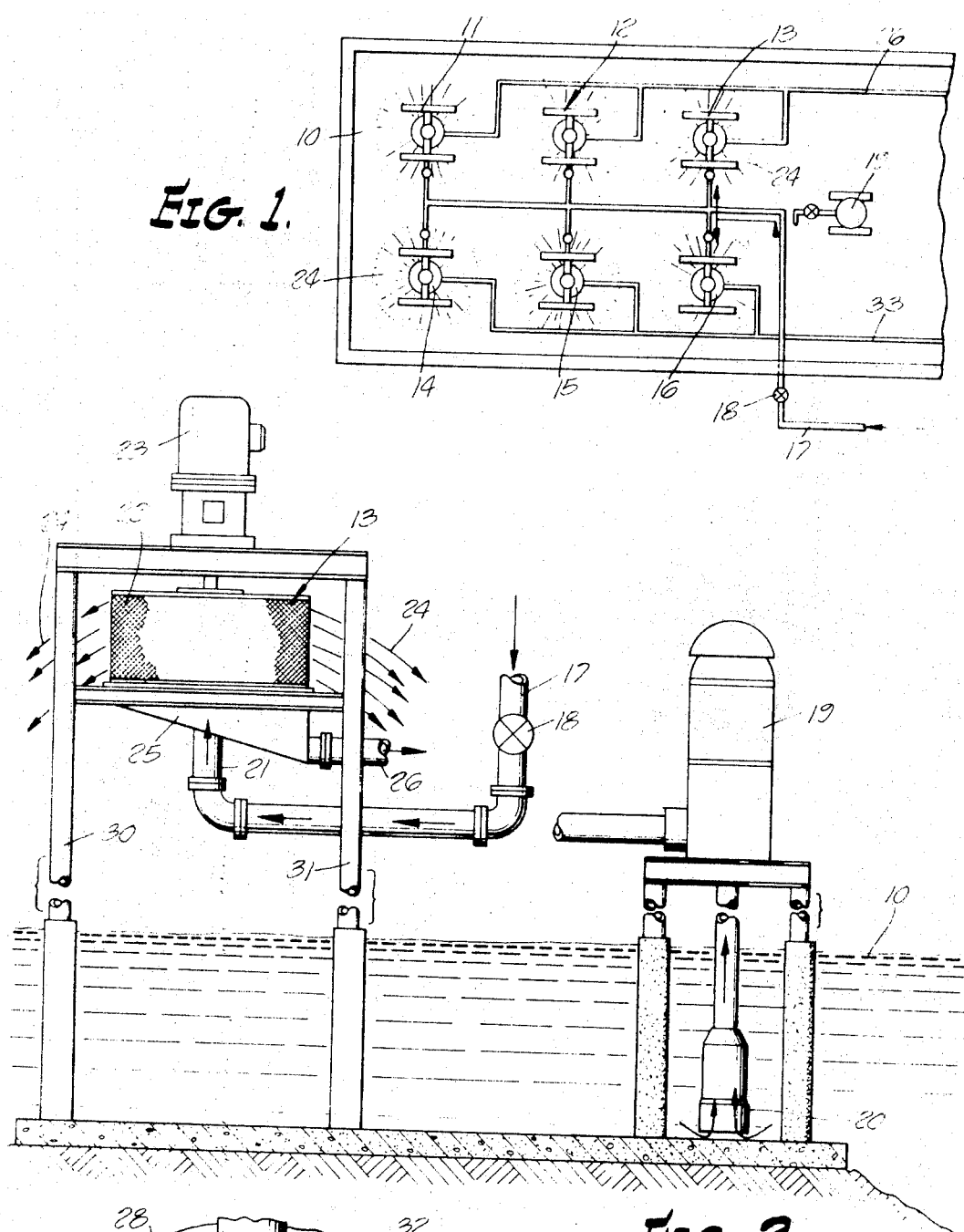
FIG. 2.
FIG. 3.
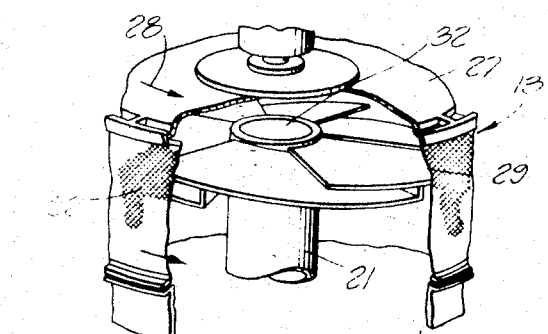
INVENTOR.
ROBERT F. MILLER, JR.
BY
Lyon & Lyon
ATTORNEYS 3,739,912

SCREENING AND AERATING CONCENTRATOR

CROSS REFERENCE TO RELATED APPLICATION

Reference is made to an application entitled "Screening Aerator Concentrator," filed concurrently herewith in the names of Philip H. Mook and Theodore R. Westfall U.S. Pat. Ser. No. 140,929, which application is assigned to the assignee of the present application and the disclosure of which is incorporated herein by reference.

BACKGROUND OF THE INVENTION

The field of the invention is wastewater treatment and more particularly is principally directed to the early stage treatment of concentration of untreated or partially treated sewage; however, the concepts herein may be used at any desirable point in the sewage treatment process. It is known to aerate sewage for aerobic digestion. The purpose of aeration is to provide oxygen transfer into the liquid to increase the dissolved oxygen content thereof which, in turn, greatly increases digestion of the sewage by bacteria. Some aeration systems employ the principle of pumping liquid through the air at a very high rate, as from the edge of a whirling disc. In other systems, air is introduced under pressure beneath the surface of the liquid.

A rotating screen wastewater concentrator is disclosed in an application filed on June 1, 1970, U.S. Pat. Ser. No. 42,099, entitled "Rotating Screen separator" by Philip H. Mook and Theodore R. Westfall and assigned to the assignee of the present application, the disclosure of which is also incorporated by reference herein. This latter application discloses a use of a rotating screen concentrator to increase the efficiency of wastewater treatment plants by separating out and releasing excess water. In this way, it is possible to treat essentially all of the particulate solid wastes even at times when the influent rate would otherwise overload the treatment facilities.

Incoming wastewater to be treated is sometimes fed to a holding pond or lagoon but usually is fed by the sewage collection system directly to the treatment facilities. The lagoon can function both to minimize the effect of variable influent rates and can also be utilized as a first stage settling basin or aeration basin. Although the benefits of aeration and the benefits of screen concentration have been recognized, no prior method has been devised which combines these functions. In order to attain the recognized benefits of aeration, separate aeration systems have been installed.

The present invention is directed to a method, and system, of screening and aerating wastewater through the use of one or more rotating screen concentrators, wherein an influent, or material to be concentrated, is fed to the interior of a generally cylindrical rotating screen. The influent typically is from a combination storm drain and sewer system, but likewise can come from a sewage treatment plant, and is fed outwardly from the center of a rotating screen cage against a generally cylindrical rotating screen. The effluent is the fluid which passes outwardly through the screen; whereas the fluid and the solid material which does not pass through the screen is collected as a concentrate stream. The concentrator should have no significantly confining exterior housing, or at least only a limited amount of covering on the exterior thereof, so as to readily permit dispersion of atomized effluent which passes through the screen to contact air for increasing the disolved and/or entrained oxygen in the effluent. In other words, the effluent, which is essentially atomized in passing through the screen, is allowed to disperse, preferably but not necessarily over a reasonably wide range or area to allow more contact time with the air, rather than significantly confining the effluent flow emanating from the screen. This may be accomplished by allowing relatively unobstructed fall of the effluent from the screen outwardly and downwardly into a container, storage tank, treatment lagoon, or the like.

In an exemplary embodiment of the present concepts, one or more rotating screen concentrators may be placed above the surface of a container such as a wastewater storage lagoon. The effluent is permitted to fall or rain down upon the surface of the lagoon thereby enhancing the effluent-air contact and thus increasing the amount of disolved and entrained oxygen in the effluent. As is known, the disolved oxygen aids in aerobic digestion. Additionally, the entrained oxygen aids in frothing of the effluent which can facilitate the subsequent separation of fine solids which pass through the screen as well as oils and the like, as more particularly set forth in said co-pending patent application entitled "Screening Aerator Concentrator." The concentrated material, or concentrate stream, may be pumped away for further treatment or separation. Thus, the present concepts result in combined concentration and aeration.

Accordingly, it is a principal object of the present invention to provide a new method of screening and aerating wastewater, such as storm water overflow.

Another object of this invention is to provide an improved method of screening and aerating wastewater which obviates the need for separate aeration equipment.

A further object of this invention is to provide an improved method of aeration of wastewater containing sewage.

Another object of this invention is to provide a system for combined screening and aeration of a wastewater influent.

An additional object of this invention is to provide a screening and aerating system for use with storage lagoons and the like.

These and other objects and features of the present invention will become better understood through a consideration of the following description and the drawings.

BRIEF DESCRIPTION OF THE DRAWINGS

FIG. 1 is a plan view of an exemplary embodiment of the present concepts showing a portion of a wastewater storage lagoon and a plurality of rotating screening concentrators;

FIG. 2 is an enlarged side elevation of a pump and one concentrator of FIG. 1; and FIG. 3 is an enlarged perspective view, partially broken away of a portion of the concentrator of FIG. 2.

DESCRIPTION OF THE PREFERRED EMBODIMENTS

Although the concepts of the present invention relate generally to screening and aerating wastewater, the same will be described in connection with the use of a plurality of rotating screen concentrators in combination with a treatment lagoon. However, it is to be understood that one or more such concentrators may be used for this purpose, either above any other suitable collecting means or lagoon for receiving the effluent dispersed from the rotating screen of the concentrator.

Turning now to FIG. 1, there is shown a treatment lagoon 10 which has mounted above its surface six rotating screen wastewater concentrators 11 through 16. The lagoon 10 has cement walls and floor but such lagoons may also be earth filled and plastic lined. The influent to the concentrators comes from an influent line 17 which may lead from a storm sewage system. This influent contains suspended solids, but preferably the larger solids such as branches and the like have been removed by passing the stream over a bar rack with one-half inch clear openings upstream of the equipment shown in FIG. 1. A fluid head is maintained in influent line 17 either by the use of a pump or a constant head tank or both. The influent flow may be interrupted with a valve 18 which is preferably a gate valve. Valve 18 may be provided with a V orifice insert for throttling control. A valve may be provided at the influent inlet of each concentrator to allow selective feed of influent to any number of the concentrators 11 through 16.

One or more sump pumps, only one such pump 19 being shown, are provided for pumping concentrate material from the lagoon 10 through pump inlet 20 for further sewage treatment as desired. The inlet 20 of pump 19 is preferably near the bottom of the lagoon to maximize the amount of solids picked up. Although not shown, the pump 19 and valve 18 may be interconnected and regulated to provide a combined feed from pump 19 and line 17 to the concentrators 11 – 16. In this way the wastewater in the lagoon could be aerated and further separated during periods when the flow from influent line 17 is low. Normally only the influent from line 17 is supplied to the concentrators 11 through 16. However, rotating screen concentrators operate most efficiently over a particular flow rate range, and by combining these two sources of feed the concentrators could be operated at more optimum flow rates.

Turning now to FIG. 2, there is shown a side elevation of one of the concentrators 13 and the sump pump 19. Material normally is supplied directly to the concentrator from the influent line 17 as noted above. This material is supplied to the inlet 21 of the concentrator 13, and is caused to flow outwardly against the interior of a generally cylindrical rotating screen 22. The screen 22 is supported along its axis from above and is driven by a motor 23 mounted above the screen. A stationary distribution dome or distributor 27 is located within the rotating screen 22 of concentrator 13 as shown in FIG. 3, and the dome functions to direct the influent to be separated as inclined streams against the rotating screen 22. The preferred direction of rotation of the screen cage is indicated by an arrow 28 on the top of screen cage 22 in FIG. 3. The shape of the distribution dome 27 causes a downward inclination of the influent streams in the direction of rotation. In this way, the flow of solids downwardly along the inside surface of the screen is enhanced. The concentrator may be supported in any suitable manner, such as by four tubular legs, only legs 30 and 31 being shown in FIG. 2.

The screened effluent is indicated generally at 24 and rains down upon the surface of the lagoon 10. Preferably, no housing is used around the screen 22 so as to allow free dispersion of the broken-up and atomized effluent 24 and thus improved contact with the surrounding air. By allowing the free outward and downward fall of the effluent, the same is dispersed over a relatively wide range and allows both a greater area of contact as well as increased time of contact with the surrounding air as compared to similar apparatus with a housing disposed about the screen. This enables an increase in the disolved and entrained oxygen. The disolved oxygen facilitates aerobic digestion as well as the sustaining of life in a stream or the like into which the effluent may be discharged. The entrained oxygen, or bubbles, enhances entrainment of fine solids, oils and the like. The effluent may rain down upon the surface of the lagoon 10, or be collected by any other suitable means such as a collector pan or storage vessel beneath the rotating screen 22, for either further treatment or discharge into a stream.

That material or concentrate which does not pass through the rotating screen 22 is collected below the concentrator in a base 25 and passes from the base to a concentrate outlet pipe 26. The pipe 26 typically leads either to the sewage treatment plant or to a further settling and concentrating basin.

The operating conditions of the concentrators are related to the size of the rotating screen. It is desirable to operate at a speed of revolution which will cause the solid wastes which do not pass through the screen to flow downwardly along the inner surface of the screen cage while at the same time permitting a relatively large volume of effluent to pass through the screen. Thus, if the speed of rotation is too great, the solids will be held against the inner surface of the screen by centrifugal force and cause a plugging up of the screen panels. It has been found that for a screen size of 165 TBC (105 micron openings) the acceleration force on a particle at the screen surface should be approximately three times the acceleration due to gravity. The force on a particle at the screen surface is proportional to the square of the speed of rotation times the radius of the screen. The relationship may be expressed as follows:

$$g \text{ force} = 2.83 r (rpm)^2 \times 10^{-5}$$

where:
 $g$ force = the relative outward centrifugal force as compared to the force of gravity
 $r$ = radius of rotating screen cage in inches
 $rpm$ = speed of rotation of screen cage in revolutions per minute.

A typical screen rotating speed for a 60 inch diameter screen 22 is approximately 65 rpm and that for a 36 inch diameter screen around 88 rpm. Since the optimum $g$ force will be influenced by the screen size as well as its relative height, $g$ forces between 1 and 7 may be useful but preferably closer to three $g$'s. Furthermore, the nature of the solid matter to be separated must be considered, because solid material which tends to stick to the screen surface requires a lower speed of rotation so that it will fall downwardly and not be trapped against the inside surface of the screen 22.

The means of feeding the influent against the inside of the screen cage need not utilize the particular dome configuration shown in FIG. 3, although this has been found to be a particularly effective feeding method. It is advantageous that the influent stream be fed almost perpendicular to the screen surface. Also a slightly downward motion as provided by the inclination of the segments of the dome 27 has been found useful in aiding the downward movement of the solid matter on the inside of the screen surface. A deflection plate may be held above the influent outlet 32 to help deflect the influent downwardly and across the surface of the distribution dome or other feeding system. Such deflection plate may be attached either to the influennt line or may be held by the rotating screen cage.

A series of six aerator-concentrators is shown in FIG. 1. As described above, the input to these concentrators preferably is from the influent line 17. The screened effluent 24 is broken into very small droplets with a large surface area and these droplets 24 rain down upon the surface of the lagoon absorbing a large quantity of air. The concentrate which has not passed through the screens flows from the concentrator bases into manifold lines 26 and 33 which lead to further settling or treatment facilities.

When the present concepts are used in combination with a storage lagoon, approximately 5 to 12 aerator-concentrators may be used. The spacing distance of one concentrator from another is dependent upon the diameter of the rain of screen effluent. Although a certain amount of overlap of the screened effluent is not detrimental, the concentrators should not be so close that the effluent from one concentrator impinges against a neighboring concentrator.

The height of the screen cage above the surface of the lagoon, or other suitable effluent collector, should be such that the screened effluent is permitted to absorb a relatively large amount of air. Thus, the height should be such that most of the fine fluid particles fall essentially downwardly rather than horizontally at the time they meet the surface of the collector means.

It is believed that the aeration effect of the aerator-concentrator is particularly effective when a fine mesh screen, such as 165 TBC (105 micron openings), is used. It is believed that the effluent is broken up on passing through the very fine mesh screen, thereby creating a very great water surface area. This high surface area provides for enhanced air-liquid contact. The result is a very efficient method for providing for oxygen transfer into the liquid as well as for separating the liquid from suspended solids.

Depending upon influent flow rate, one or more concentrators may be used. In the lagoon system, it is not necessary to run all aerator-concentrators at the same time. For instance, with a very light influent rate and a well aerated treatment lagoon, only one aerator concentrator need be operated. Likewise, with increasing influent rates or a partially aerated treatment lagoon additional concentrators can be run.

The present embodiments of this invention are thus to be considered in all respects as illustrative and not restrictive, the scope of the invention being indicated by the appended claims rather than by the foregoing description, and all changes which come within the meaning and range of equivalency of the claims therefore are indicated to be embraced therein.

What is claimed is:

1. A method of concentrating and aerating wastewater comprising
   supplying wastewater influent to the inlet of a concentrator having a substantially stationary distributor and a rapidly rotating substantially cylindrical screen,
   impinging said influent substantially radially on to said screen and deriving a concentrate and an effluent,
   collecting said concentrate, and allowing the screened effluent to fall freely from said screen to increase the oxygen in said effluent, and collecting said effluent.

2. The method of claim 1 wherein
   said screen is rotated at a speed to impart an acceleration force on a particle at the screen surface of several times the acceleration due to gravity.

3. The method of claim 1 wherein
   said concentrator is positioned above a treatment lagoon and said effluent is collected in said treatment lagoon.

4. Apparatus for concentrating and aerating a stream of solids-containing wastewater comprising
   at least one concentrator having a rotating substantially cylindrical screen cage and a substantially stationary distribution means, said distribution means being positioned within said rotating screen cage for causing the solids-containing wastewater to impinge substantially radially onto screen for separation of said influent into a concentrate and an effluent, said concentrator being mounted above collecter means to permit screened effluent to fall freely into said collecter means while allowing contact of said effluent with air for increasing oxygen in said effluent, and
   means for conveying said concentrate away from said concentrator.

5. The apparatus of claim 4 wherein
   said collection means includes means for conveying the aerated effluent to a stream.

6. The apparatus of claim 4 wherein said collection menas is a treatment lagoon.

7. The apparatus of claim 6 wherein
   a plurality of said concentrators are mounted above said treatment lagoon.

8. The apparatus of claim 4 wherein
   said distribution means includes a stationary distributor inside said rotating screen cage, said distributor being positioned to allow influent to flow across the upper surface of said distributor and against the inner surface of said rotating screen cage.

9. The apparatus of claim 8 wherein
   the screen of said rotating screen cage is approximately 165 mesh tensile batting cloth.

10. The apparatus of claim 7 wherein
    approximately 5 to 12 rotating screen concentrators are mounted above said treatment lagoon.

11. The apparatus of claim 10 including
    valve means coupled with each concentrator to selectively allow feed of influent to any number of said concentrators.

* * * * *